(12) United States Patent
Chew et al.

(10) Patent No.: US 9,172,647 B2
(45) Date of Patent: Oct. 27, 2015

(54) DISTRIBUTED NETWORK TEST SYSTEM

(71) Applicant: Ixia, Calabasas, CA (US)

(72) Inventors: Chiat Earl Chew, Vancouover (CA); Michael D. Hutchison, Richmond (CA)

(73) Assignee: Ixia, Calabasas, CA (US)

( * ) Notice: Subject to any disclaimer, the term of this patent is extended or adjusted under 35 U.S.C. 154(b) by 434 days.

(21) Appl. No.: 13/870,886

(22) Filed: Apr. 25, 2013

(65) Prior Publication Data

US 2014/0321285 A1     Oct. 30, 2014

(51) Int. Cl.
*H04L 12/26*     (2006.01)
*H04L 12/851*     (2013.01)

(52) U.S. Cl.
CPC .............. *H04L 47/24* (2013.01); *H04L 43/10* (2013.01); *H04L 43/12* (2013.01); *H04L 43/50* (2013.01)

(58) Field of Classification Search
None
See application file for complete search history.

(56) References Cited

U.S. PATENT DOCUMENTS

| | | | |
|---|---|---|---|
| 5,247,517 A | 9/1993 | Ross et al. | |
| 5,329,412 A | 7/1994 | Stefansky | |
| 5,477,531 A | 12/1995 | McKee | |
| 5,600,632 A | 2/1997 | Schulman | |
| 5,787,253 A | 7/1998 | McCreery et al. | |
| 5,805,927 A | 9/1998 | Bowes et al. | |
| 5,822,520 A | 10/1998 | Parker | |
| 5,974,237 A | 10/1999 | Shurmer et al. | |
| 6,028,847 A | 2/2000 | Beanland | |
| 6,172,989 B1 | 1/2001 | Yanagihara | |
| 6,233,256 B1 | 5/2001 | Dieterich et al. | |
| 6,295,557 B1 | 9/2001 | Foss | |
| 6,321,264 B1 | 11/2001 | Fletcher | |
| 6,545,979 B1 | 4/2003 | Poulin | |
| 6,717,917 B1 | 4/2004 | Weissberger et al. | |
| 6,728,214 B1 | 4/2004 | Hao et al. | |
| 6,950,405 B2 | 9/2005 | Van Gerrevink | |
| 7,143,153 B1 | 11/2006 | Black et al. | |
| 7,187,683 B1 | 3/2007 | Sandoval et al. | |
| 7,231,558 B2 | 6/2007 | Gentieu et al. | |
| 8,174,991 B1 | 5/2012 | Trivedi | |
| 2002/0183969 A1 | 12/2002 | Hanes et al. | |
| 2003/0033406 A1 | 2/2003 | John et al. | |
| 2003/0231741 A1 | 12/2003 | Rancu et al. | |
| 2004/0236866 A1 | 11/2004 | Dugatkin et al. | |
| 2005/0169585 A1 | 8/2005 | Aronson et al. | |
| 2006/0045019 A1 | 3/2006 | Patzschke et al. | |
| 2006/0045432 A1 | 3/2006 | Anderson | |
| 2006/0291857 A1 | 12/2006 | Mackenzie et al. | |
| 2007/0025261 A1 | 2/2007 | Ginsberg et al. | |
| 2007/0088981 A1 | 4/2007 | Noble et al. | |
| 2007/0115833 A1 | 5/2007 | Pepper et al. | |
| 2007/0291654 A1 | 12/2007 | Pepper | |

(Continued)

*Primary Examiner* — Kevin C Harper
(74) *Attorney, Agent, or Firm* — SoCal IP Law Group LLP; John E. Gunther; Steven C. Sereboff

(57) ABSTRACT

There are disclosed a system, a test head and a method for testing a device under test. Two or more test heads may be mated directly with respective connectors on the device under test. Each test head may include a traffic generator including a stateless packet builder to generate stateless traffic for transmission to the device under test, and a traffic receiver including a stateless packet analyzer to accumulate traffic statistics on stateless traffic received from the device under test. A server coupled to the two or more test heads via respective communications links, may generate stateful traffic for transmission to the device under test by the two or more test heads, and may process stateful traffic received from the device under test by the two or more test heads.

18 Claims, 5 Drawing Sheets

(56) References Cited

U.S. PATENT DOCUMENTS

| | | |
|---|---|---|
| 2008/0112332 A1 | 5/2008 | Pepper |
| 2008/0198742 A1* | 8/2008 | Kaempfer ............... H04L 43/50 370/230 |
| 2008/0256256 A1* | 10/2008 | Acharya et al. ....... H04L 65/105 709/238 |
| 2009/0265142 A1 | 10/2009 | Liu et al. |

* cited by examiner

DISTRIBUTED NETWORK TEST SYSTEM

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to generating and receiving traffic for testing a network or network device.

2. Description of the Related Art

In many types of communications networks, each message to be sent is divided into portions of fixed or variable length. Each portion may be referred to as a packet, a frame, a cell, a datagram, a data unit, or other unit of information, all of which are referred to herein as packets.

Each packet contains a portion of an original message, commonly called the payload of the packet. The payload of a packet may contain data, or may contain voice or video information. The payload of a packet may also contain network management and control information. In addition, each packet contains identification and routing information, commonly called a packet header. The packets are sent individually over the network through multiple switches or nodes. The packets are reassembled into the message at a final destination using the information contained in the packet headers, before the message is delivered to a target device or end user. At the receiving end, the reassembled message is passed to the end user in a format compatible with the user's equipment.

Communications networks that transmit messages as packets are called packet switched networks. Packet switched networks commonly contain a mesh of transmission paths which intersect at hubs or nodes. At least some of the nodes may include a switching device or router that receives packets arriving at the node and retransmits the packets along appropriate outgoing paths. Packet switched networks are governed by a layered structure of industry-standard protocols. Each layer of this structure, commonly called a protocol stack, processes traffic received from and destined for adjacent layers of the protocol stack. The Open Systems Interconnect (OSI) model defines seven possible layers in a protocol stack. The TCP/IP (Transmission Control Protocol/Internet Protocol) suite used for the Internet has five layers that are commonly referred to as layers 1, 2, 3, 4, and 7, where the numbers refer to the most nearly corresponding layers of the OSI model. Layers 1, 2, 3, 4, and 7 of the TCP/IP protocol suite are the physical layer, the link layer, the internetworking layer, the transport layer, and the application layer, respectively.

Layer 1 protocols define the physical (electrical, optical, or wireless) interface between nodes of the network. Layer 1 protocols include various Ethernet physical configurations, the Synchronous Optical Network (SONET) and other optical connection protocols, and various wireless protocols such as Wi-Fi.

Layer 2 protocols govern how data is logically transferred between nodes of the network. Layer 2 protocols include the Ethernet, Asynchronous Transfer Mode, Frame Relay, Point to Point Protocol, Layer 2 Tunneling Protocol, Fiber Distributed Data Interface, Synchronous Data Link Control, High-Level Data Link Control, Integrated Services Digital Network, Token Ring, various wireless protocols, various Ethernet and Fibre Channel protocols, and other protocols.

Layer 3 protocols govern how packets are routed from a source to a destination along paths connecting multiple nodes of the network. The dominant layer 3 protocols are the well-known Internet Protocol version 4 (IPv4) and version 6 (IPv6). A packet switched network may need to route IP packets using a mixture of layer 2 protocols and layer 1 protocols. At least some of the nodes of the network may include a router that extracts a destination address from a network layer header contained within each packet. The router then uses the destination address to determine the route or path along which the packet should be retransmitted. A typical packet may pass through a plurality of routers, each of which repeats the actions of extracting the destination address and determining the route or path along which the packet should be retransmitted.

Layer 4 protocols govern end-to-end message delivery in a network. In particular, the Transmission Control Protocol (TCP) provides for reliable delivery of packets streams using a system of sequential acknowledgement and retransmission when necessary. TCP is a connection-oriented protocol in which two devices exchange messages to open a virtual connection via the network. Once a connection is opened, bidirectional communications may occur between the connected devices. The connection may exist until closed unilaterally by one of the devices. Opening and closing a connection both require several steps at which specific messages are exchanged between the two devices. A connection may also be closed when an anticipated response is not received by one device for a predetermined period of time, commonly called a "time-out". A TCP connection is considered to be "stateful" since each device must maintain information describing the state of the connection (i.e. being opened, established, being closed), what data has been sent, and what sent data has been acknowledged.

The User Datagram Protocol (UDP) is an alternative layer 4 protocol that provides for delivery of packet streams. UDP connections are "stateless" in that received UPD messages are not acknowledged by the receiving device and neither the sending nor receiving devices maintain information describing the state of the connection. UDP does not provide for reliable delivery.

Layer 7 protocols include the Hyper-Text Transfer Protocol (HTTP) used to convey HTML documents such as Web pages, and the Simple Mail Transfer Protocol (SMTP) and Post Office Protocol (POP3) used to convey electronic mail messages. Other layer 7 protocols include Simple Message System (SMS), File Transfer Protocol (FTP), Real Time Protocol (RTP), Real-time Transport Control Protocol (RTCP), Real Time Streaming Protocol (RTSP), Media Gateway Control Protocol (MEGACO), Session Initiation Protocol (SIP), and other protocols used to transfer data, voice, video, and network control information over a network.

In this patent, the term "device under test" (DUT) means any system or apparatus being tested by a network test system. A DUT may be a device such as a switch, router, server, or load balancer; an interconnected plurality of devices such as a server cluster; or all or a portion of a packet switched communications network. In order to test a DUT, test traffic comprising a large number of packets may be generated and transmitted to and/or through the DUT at one or more ports. Return test traffic transmitted through and/or from the DUT may be received at different ports. The received test traffic may be analyzed to measure the performance of the DUT. In this context, the term "port" refers to a communications connection between the DUT and the equipment used to test the network.

Typically, test traffic is a mix of stateless and stateful traffic. Since a test port must establish its presence to the DUT, test traffic almost always includes some stateful network control traffic using one or more routing protocols, such as Open Shortest Path First (OSPF), Intermediate System to Intermediate System (IS-IS), Interior Gateway Routing protocol (IGRP), Enhanced Interior Gateway Routing protocol (EIGRP), Routing Information Protocol (RIP), and/or Border Gateway Protocol (BGP). When a DUT is a switch or router operating at layer 2 or layer 3 of the network structure, the test traffic may be predominantly stateless IP packets apparently originating from a plurality of source IP addresses external to the DUT and destined for a plurality of destination IP addresses that are also external to the DUT. When a DUT operates at a higher layer of the network structure (for example, when the DUT is or includes a server, a server load balancer, a firewall, a network security device that performs packet inspection, or similar network devices), the test traffic may include stateful TCP connections that terminate within the DUT.

Throughout this description, elements appearing in schematic and block diagrams are assigned three-digit reference designators, where the most significant digit is the figure number where the element is introduced and the two least significant digits are specific to the element. An element that is not described in conjunction with a block diagram may be presumed to have the same characteristics and function as a previously-described element having the same reference designator.

DETAILED DESCRIPTION

Description of Apparatus

Figure 1:
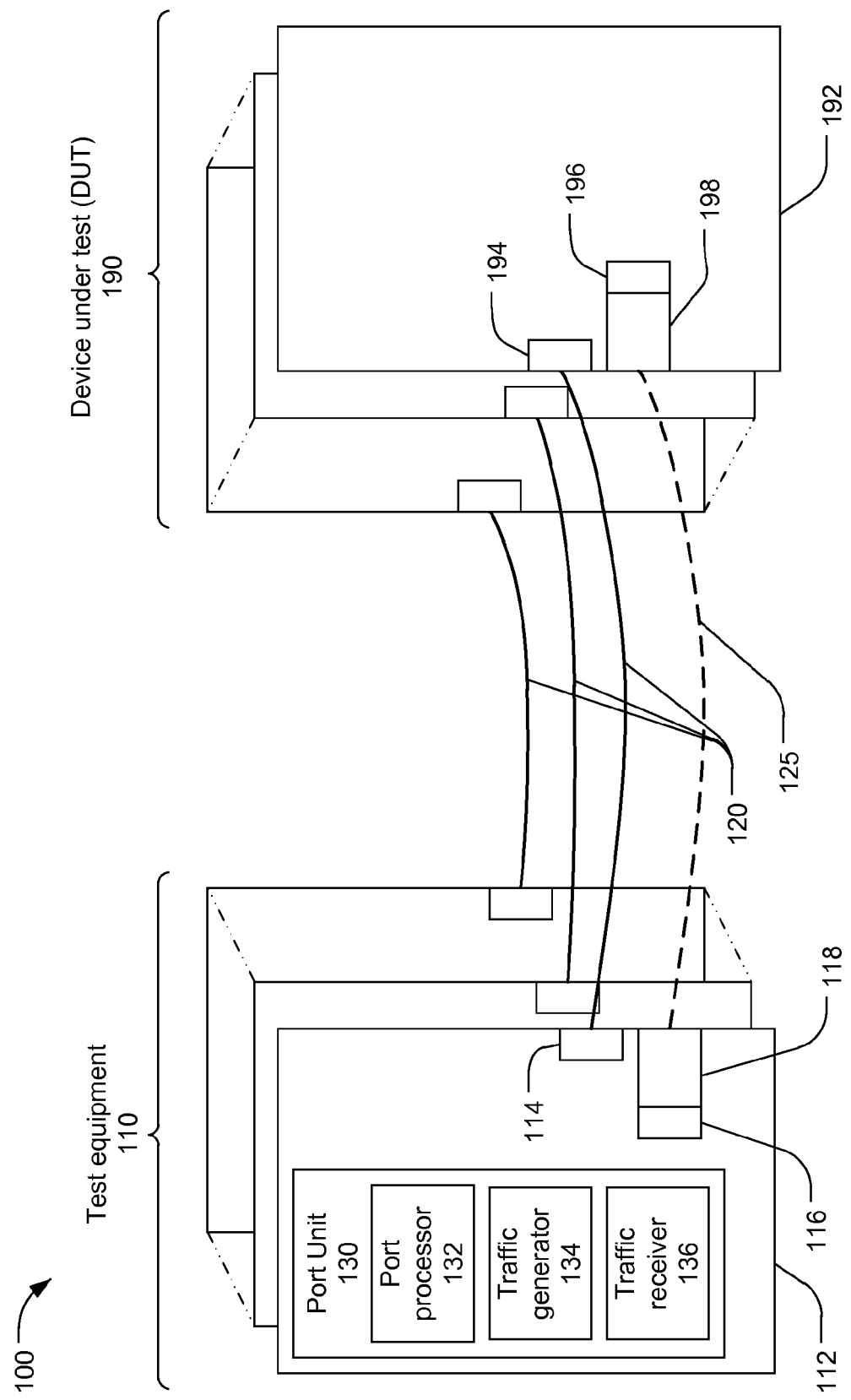
FIG. 1 is a block diagram of a test set-up.

FIG. 1 shows a schematic block diagram of a test set up 100 including a device under test (DUT) 190 and test equipment 110. The DUT 190 may be a router, a switch, a load balancer, or some other type of equipment for use within a communications network. The DUT 190 may be one or more physical units coupled to perform an integrated function such as two or more routers clustered to form a single logical unit. The DUT 190 may include or be all or a portion of a network.

As shown in the example of FIG. 1, the DUT 190 may include a plurality of network cards 192, also commonly called line cards or blades. The network cards 192 may be mounted in a chassis and coupled to a mother-board, neither of which are shown in FIG. 1. The DUT 190 may include other cards, such as switch fabric cards or processor cards, which are also not shown in FIG. 1. The DUT 190 may be configured in some other physical form that does not include network cards.

The DUT 190 may include a plurality of ports for communications with other equipment such as the test equipment 110. A low-end switch or router may have, for example, 32, 48 or 64 ports. A high-end network device may have 1000 or more ports.

Each network card 192 may provide one or more ports. The ports of the DUT 190 may be connected to corresponding ports of the test equipment 110 by links 120. The links 120 may be wire cables or optical fiber cables. Communications between the DUT 190 and the test equipment 110 over the links 120 may conform to a standard such as an ETHERNET standard, a SONET (synchronous optical networking) standard, a FIBRE CHANNEL standard, or some other communications standard. Each standard may define a plurality of communications rates. The links 120 may be implemented using different optical fiber types, optical wavelengths, and source laser types depending on the required communications rate and the length of the links. Communications over either wire or optical links may be half-duplex, which is to say that separate wires or optical fibers may be used for communications to and from the DUT.

Each network card 192 may include an electrical or optical connector 194. To allow each network card 192 to be compatible with a variety of different communications links, each network card may optionally include a connector 196 to receive a pluggable transceiver module 198. Network cards that provide a plurality of ports may include a corresponding plurality of connectors 194 or a plurality of connectors 196 for pluggable transceiver modules 198. Each pluggable transceiver module 198 may transmit and receive via separate links 125 which, in turn, may plug into connectors on the respective pluggable transceiver module 198. Each pluggable transceiver module 198 may communicate with the corresponding network card 192 through a predetermined (for each type of transceiver module) electrical interface accessed at the connector 196. Each pluggable transceiver module 198 may receive electrical power from the corresponding network card through the connector 196. Thus each network card 192 may be adaptable to a variety of communications links 120/125 through selection and installation of appropriate pluggable transceiver modules 198.

A variety of pluggable transceiver modules have been developed in accordance with multiple source agreements between competing manufacturers. For example more than 40 different small form-factor pluggable (SFP) transceiver modules are available for communications rates from 155 Mbps to 4.25 Gbps and maximum link lengths from 500 meters to 160 kilometers. SPF transceiver modules are available for use with copper cables or fiber optic cables. Similarly, a variety of enhanced small form-factor pluggable (SPF+) transceiver modules are available for communications rates up to 10.2 Gbps and 10-Gbps small form-factor pluggable (XFP) transceiver modules are available for communications rates up to 11.3 Gbps. CFP transceiver modules support communications rates up to 100 Gbps. Other types of pluggable optical transceiver modules include GBIC, XPAK, X2, and XENPAK transceiver modules. Additional types of pluggable transceiver modules may be developed.

The test equipment 110 may also include a plurality of test network cards 112. The test network cards 112 may be mounted in a chassis and coupled to a mother-board neither of which is shown in FIG. 1. The test equipment 110 may include other cards, such as a processor card, which are also not shown in FIG. 1. In the example of FIG. 1, the test equipment 110 and the DUT 190 are shown having the same number of network cards. The test equipment 110 may include more or fewer network cards than the DUT 190. The test equipment 110 may be configured in some other physical form that does not include network cards.

The test equipment 110 may include a plurality of ports for communications with the DUT 190. Each test network card 112 may provide one or more ports. Each port of the equipment under test 190 may be connected to a corresponding port of the test equipment 110 by the links 120/125. Each network card may include a connector 114 to receive a link 120. To allow each test network card 112 to be compatible with a variety of different optical links, each test network card 112 may include a connector 116 to receive a pluggable transceiver module 118. Test network cards 112 that provide a plurality of ports may include a corresponding plurality of connectors 114 or a plurality of connectors 116 for pluggable transceiver modules 118.

Each network card may include a port unit 130 corresponding to each port. The term "port unit" refers to hardware, which may be augmented by software, that connects to the DUT at a port. Each port unit 130 connected to the DUT may be a source of test traffic and/or a destination for test traffic. Each port unit 130 may emulate a plurality of logical source or destination addresses. Each port unit 130 may emulate a plurality of network users, clients, peers, servers, or other network devices.

The port unit 130 may include a port processor 132, a traffic generator 134, and a traffic receiver 136. The port processor 132 may include a processor, a memory coupled to the processor, and various specialized units, circuits, software and interfaces for providing the functionality and features described here. The processes, functionality and features may be embodied in whole or in part in software which operates on the processor and may be in the form of firmware, an application program, an applet (e.g., a Java applet), a browser plug-in, a COM object, a dynamic linked library (DLL), a script, one or more subroutines, or an operating system component or service. The hardware and software and their functions may be distributed such that some functions are performed by the processor and others by other devices.

The port processor 132 may communicate with a test administrator computing device (not shown). The test administrator may be a computing device contained within, or external to, the test equipment 110. The test administrator may provide the port processor 132 with instructions and data required for the port unit to participate in testing the DUT 190. The instructions and data received from the test administrator may include, for example, definitions of test traffic to be generated by the port unit 130 and definitions of performance statistics that may be accumulated and reported by the port unit 130.

The port processor 132 may generate at least some stateful test traffic and provide the stateful test traffic to the traffic generator for incorporation into the test traffic. The port processor 132 may also provide the traffic generator 134 with instructions and data to generate stateless traffic to be interleaved with the stateful traffic to form outgoing test traffic transmitted to the DUT 190.

The traffic receiver 136 may receive incoming test traffic from the DUT 190. The traffic receiver 136 may separate stateful traffic from the test traffic and provide the stateful traffic to the port processor 132 for processing. The traffic receiver 136 may accumulate test statistics for stateless traffic in accordance with test instructions provided by the port processor 132. The accumulated test statistics may include, for example, a total number of received packets, a number of packets received out-of-sequence, a number of received packets with errors, a maximum, average, and minimum propagation delay, and other statistics. The traffic receiver 136 may also capture and store specific packets in accordance with capture criteria provided by the port processor 132. The traffic receiver 136 may provide test statistics and/or captured packets to the port processor 132 for additional analysis during, or subsequent to, the test session.

Figure 2:
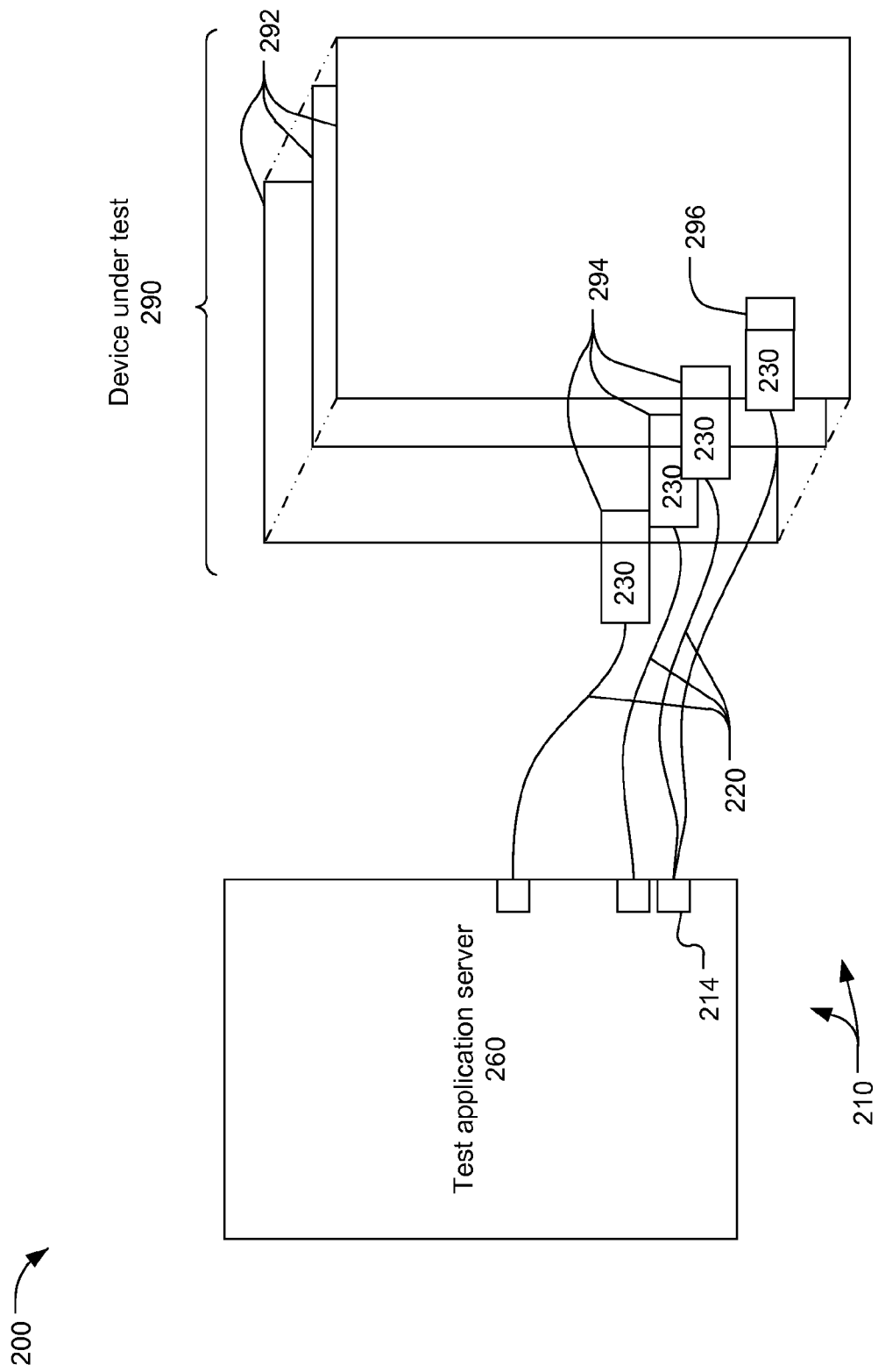
FIG. 2 is a block diagram of another test set-up.

FIG. 2 shows a schematic block diagram of another test set-up 200 including a device under test (DUT) 290 and test equipment 210. The DUT 290 may include a plurality of network cards 292. Each network card 292 may have one or more port for communications with other equipment such as the test equipment 210. Electrical connection to each port may be made at a corresponding connector 294 intended to receive a cable such as an Ethernet cable. Alternatively, electrical connection to each port may be made at a connector 296 intended to receive a pluggable transceiver module as previously described.

The test equipment 200 may include a test application server 260 and a plurality of test heads 230. Each test head 230 may be directly mated with an electrical connector on the DUT 290. In this context, the phrase "directly mated" means "physically mated without any intervening cable". Some or all of the test heads 230 may be directly mated with corresponding connectors 294 in place of electrical cables. For example, when the DUT 290 is configured to communicate using Ethernet links, each test head 230 may include a male 8-pin 8-contact plug that directly mates with a corresponding receptacle on the DUT 290. 8-pin, 8-contact, connectors are commonly referred to as "RJ45" connectors although they may not conform to the RJ45(S) industry standard. Some or all of the test heads 230 may be directly mated with corresponding connectors 296 in place of pluggable transceiver modules.

Each test head 230 may be coupled to the test application server via a communications link 220. Each communication link 220 may be a wired link such as an I2C (inter-integrated circuit) connection, a USB™ (universal serial bus) connection, or an Ethernet connection. Each communications link 220 may conform to a wireless communications standard such as an IEEE 802.11, 802.15, or 802.16 standard, or an industry working group standard, such as WiFi®, WiMax®, ZigBee®, or Bluetooth®, which may or may not be based on one of the IEEE standards. Each communication link 220 may conform to another existing or future communications standard. Each communication link 220 may be proprietary and not conform to an existing standard.

As discussed in conjunction with FIG. 1, the test equipment 210 may include a port unit connected to each port of the DUT 290. However, in the test equipment 210, each port unit may be distributed between the test application server 260 and a test head 230. In general, each test head 230 may contain a traffic generator and a traffic receiver similar to the traffic generator 134 and the traffic receiver 136 of the port unit 130. The function of the port processor 132 of the port unit 130 may be performed by the test application server 260. The test application server may function as the port processor for a plurality of port units, each of which includes a corresponding test head 230.

Figure 3:
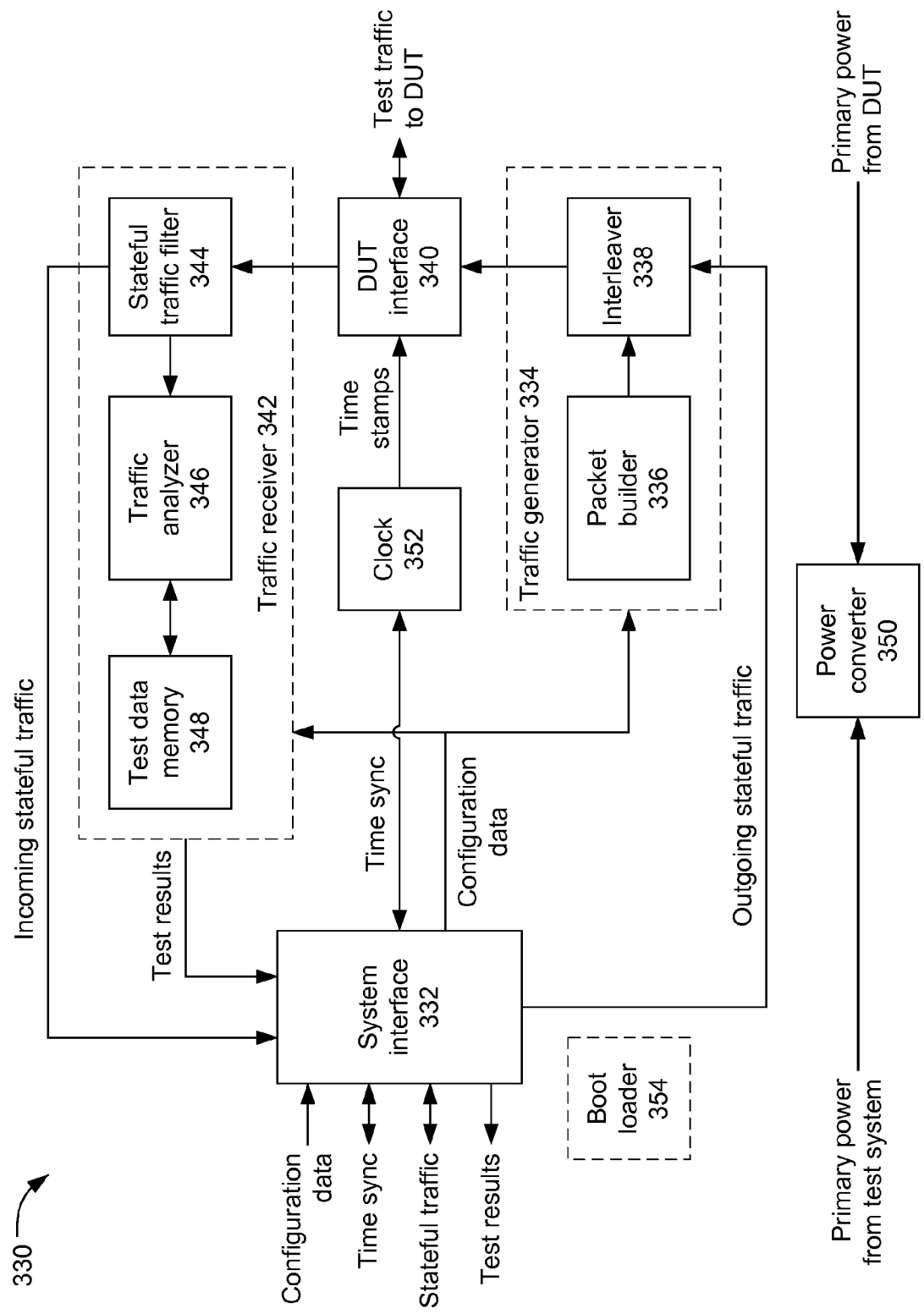
FIG. 3 is a functional block diagram of a test head.

Referring now to FIG. 3, a test head 330 may include a system interface 332, a traffic generator 334, a DUT interface 340, a traffic receiver 342, and a power converter 350. The system interface 332 may communicate with a remote test application server, such as the test application server 260, using a wired communications protocol such as Ethernet, I2C, or USB, or using a wireless communications protocol such as WiFi®, ZigBee®, or Bluetooth®.

The system interface 332 may receive configuration data from the test application server. The configuration data may be used to configure the test head for a particular test session. The received configuration data may include data defining the traffic to be generated by the traffic generator 334. The received configuration data may include data defining test data to be acquired, packets to be captured, and/or test results to be reported by the traffic receiver 342.

In some embodiments, portions of the test head 330 may be implemented using field programmable gate arrays or other programmable devices. In such embodiments, the configuration data received by the system interface 332 from the test application server may also include programming data. The programming data may be used, for example, to program one or more programmable devices to implement all or portions of the traffic generator 334 and/or the traffic receiver 342. Test heads containing one or more programmable devices may include a boot loader 354 to accept programming data from the system interface and load the programming data into the programmable device.

The system interface 332 may also receive outgoing stateful traffic from the test application server and may forward the outgoing stateful traffic to the traffic generator 334 for incorporation into the outgoing test traffic. The system interface 332 may receive incoming stateful traffic from the traffic receiver 342 and may forward the incoming stateful traffic to the test application server for processing. The system interface 332 may also receive test results, such as test statistics and captured packets, from the traffic receiver 342 during or after a test session, and may forward the test results to the test application server for storage, reporting, and/or further processing.

An important objective of a test session may be to measure latency time and jitter for packets transmitted through the network or network device under test. For example, latency may be measured by inserting a transmit timestamp into a packet to be transmitted and attaching a received timestamp to the packet upon reception. The difference between the transmit timestamp and the receive timestamp is the latency for that packet. The variance in latency over a plurality of packets transmitted between the same source and destination is the jitter. However, during a test session, packets are commonly transmitted by one test head and received by a different test head. Thus, to accurately measure latency and jitter, the plurality of test heads involved in a test session must have a common time reference.

The test head 330 may include a clock 352 to provide transmit timestamps inserted in outgoing packets and received timestamps attached to received packets. The clock 352 may be synchronized with a master time clock within or coupled to the test application server. For example, the system interface 332 may receive time synchronization data from the test application server. The time synchronization data may be, for example, in accordance with the Precision Time Protocol or IEEE 1588-2008 protocol. For improved accuracy, the communications link between the system interface 332 and the test application server may be a Synchronous Ethernet, or SyncE, link which conveys a precision clock signal from the test application server to the test head 330.

The traffic generator 334 may include a packet builder 336 and an interleaver 338. The packet builder 336 may build a sequence of packets in accordance with the configuration data received from the test application server via the system interface 332. The sequence of packets may be exclusively or primarily stateless traffic. The sequence of packets may include a mixture of packets of various types, lengths, and protocols as defined by the configuration data. The interleaver 338 may incorporate the outgoing stateful traffic into the sequence of packets from the packet builder 336 to form the outgoing test traffic. For example, the interleaver 338 may include a first-in first-out (FIFO) queue for internally-generated packets built by the packet builder 336 and a FIFO queue for stateful traffic packets received from the test application server via the system interface 332. The interleaver 338 may then form the outgoing test traffic by selecting packets from the heads of the internally-generated and stateful packet queues in accordance with one or more priority rules. For example, a simple priority rule would be "a stateful packet, when available, always has priority over stateless packets of any type."

The DUT interface 340 may receive outgoing test traffic from the interleaver 338 and convert the outgoing test traffic into the electrical signals required to convey the test traffic to the DUT The DUT interface 340 may insert a transmit timestamp from the clock 352 into some or all of the outgoing test traffic. Similarly, the DUT interface 340 may receive electrical signals from the DUT and may convert the received signals into incoming test traffic in a format usable to the traffic receiver 342. The DUT interface 340 may attach a receive timestamp from the clock 352 into some or all of the received test traffic.

The traffic receiver 342 may include a stateful traffic filter 344 to separate stateful traffic from the incoming stateless test traffic. The stateful traffic filter 344 may recognize stateful traffic based on one or more fields from the header of each received packet. For example, the stateful traffic filter may recognize stateful traffic based on a protocol field, a MAC address, an IP address, and/or some other field from the header of each received packet. The stateful traffic filter 344 may forward all incoming stateful traffic, or at least a large portion of the incoming stateful traffic, to the system interface 332 for transmission to the test application server.

The traffic receiver 342 may also include a traffic analyzer 346 coupled to a test data memory 348. The traffic analyzer 346 may accumulate traffic statistics and capture selected packets as instructed by the configuration data received from the test applications server via the system interface 332. Accumulated traffic statistics and captured packets may be stored in the test data memory 348. Some or all of the stored accumulated traffic statistics and captured packets may be transmitted to the test application server via the system interface 332 during and/or after a test session. The traffic analyzer 346 may accumulate traffic statistics for both stateful and stateless traffic.

The test head 330 may include a power converter 350 that receives primary power from the DUT. The power converter 350 may convert the primary power into one or more operating voltages for the components of the test head 330. For example, the DUT may be configured to provide power over Ethernet in accordance with IEEE standard 802.3af. In this case, a test head plugged into an Ethernet port on the DUT may receive up to 25.5 watts of power at a minimum voltage of 44 volts DC. The test head 330 may be configured to plug into the DUT in replacement of an optical transceiver module. In this case the test head 330 may make use of the power normally provided from the DUT to the transceiver module. For example, a test head for use in replacement of an SFP+ transceiver module may receive up to 1.5 watts of power from the DUT. A test head for use in replacement of an XFP transceiver module may receive up to 3.5 watts. A test head for replacement of a CFP transceiver module may receive at least 8 watts from the DUT.

Alternatively, the power converter 350 may receive primary power from the test system. For example, the test head 330 may interface with the application server using an Ethernet connection. In this case, the test head 330 may receive primary power over the Ethernet connection as previously described. The test head may interface with the application server using a USB connection which includes a 5-volt power line providing up to 2.5 watts of power. The test head may interface with the application server using a wireless data connection and receive primary power from the test system over a separate wired connection. The test head 330 may receive electrical power form the test system in some other manner.

The test heads used in a test set-up may not necessarily have all of the functional elements shown in FIG. 3. For example, receive-only test heads may not include all or portions of the traffic generator 334, and transmit-only test heads may not include all or portions of the traffic receiver 342. A test set-up, such as the test set-up 200, may use full-feature test heads as shown in FIG. 3, or a combination of full-feature, receive-only, and/or transmit-only test heads.

Figure 4:
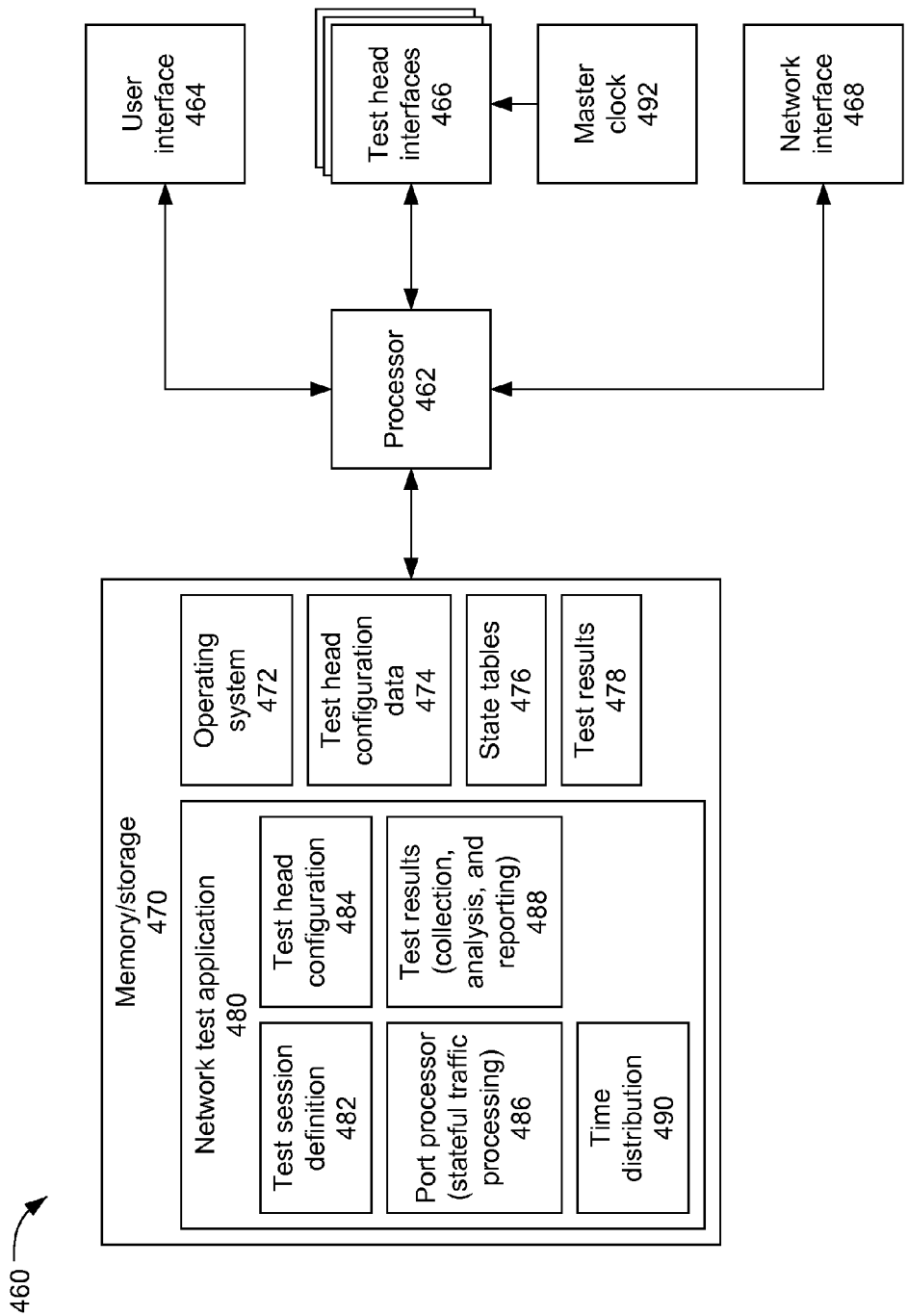
FIG. 4 is a block diagram of a test application server.

Referring now to FIG. 4, a test application server 460, which may be the test application server 260, may include a processor 462 coupled to a user interface 464, a plurality of head interfaces 466, a network interface 468, and a memory/storage subsystem 470. A master clock 492 may be part of or coupled to the test application server. The processor 462 may include a microprocessor device having one or more processor cores. The processor 462 may include multiple microprocessors devices. The processor 462 may include processors or processor cores of different types such as general purpose processors, graphics processors, mathematical coprocessors, and/or digital signal processors. The processor 462 may include other circuits and components as required to perform the functions described herein.

The user interface 464 may include at least one display device and at least one data entry device such as a keyboard, a touch panel, and or a pointing device. The user interface 464 may be directly connected to the processor 462. The user interface 464 may be remote from the processor 462 and connected to the processor 462 via a network, a bus, or other communications path. The user interface 464 may be or operate using a computing device, such as a laptop computer, a tablet computer, a workstation, or a smart phone connected to the processor 462 via a wired or wireless communications path.

The test application server 460 may include a unique hardware test head interface 466 for each test head. Each test head interface 466 may include circuits and components required to interface between the processor 462 and the respective test head (not shown). Each test head interface 466 may be configured to communicate with the respective test head using a wired communications protocol such as Ethernet, Synchronous Ethernet, I2C, or USB, or using a wireless communications protocol such as WiFi®, ZigBee®, or Bluetooth®. The test head interface 466 may communicate with the test heads in some other manner.

The test head interface 466 may also be configured to provide primary electrical power to the test heads. For example, the test head interface 466 may communicate with the test heads using Ethernet connections. In this case, the test head interface 466 may provide primary power over the Ethernet connection as previously described. The test head interface 466 may communicate with the test heads using USB connections which include a 5-volt power line providing up to 2.5 watts of power. The test head interface 466 may provide electrical power to the test heads in some other manner.

The memory/storage subsystem 470 may include volatile memory such as static or dynamic random access memory and one or more storage devices, which are not shown separately. In this application, a "storage device" is an apparatus for nonvolatile storage of data and programs. Storage devices include magnetic disc drives and tape drives, optical disc drives, and nonvolatile semiconductor memory devices. Storage devices may include fixed or removable storage media such as magnetic discs, optical discs, and removable nonvolatile semiconductor "flash drives" or "thumb drives". In this patent, the term "storage medium" means a physical device for storing data and does not encompass transitory media such as signals and waveforms.

Data and programs may be moved or copied, in whole or in part, between a storage device and memory during a test session. For example, all or portions of a program may be copied from a storage device to memory for use by the processor 462 during a test session. Data, such as test results, developed during a test session may be held in memory during the test session and copied, in whole or in part, to a storage device during or at the conclusion of the test session.

Programs stored in the memory/storage subsystem 470 may include an operating system 472 and a network test application 480. In this contest, the term "application" means a computer program that runs in conjunction with an operating system to accomplish a particular function. The operating system 472 may be, for example, a version of Windows®, Unix®, Linux®, Chrome OS®, or another operating system. The network test application 480 may include a test session definition module 482, a test head configuration module 484, a port processor emulation module 486, and a test result collection, analysis, and reporting module 488. In this context, a "module" is a subdivision of an application. Two or more of the modules of the network test application may run concurrently. While the subsequent discussion will, for ease of explanation, refer to functions of each program module, it should be understood that the functions are realized by the test application server 460 as a whole when the processor 462 executes the program module under discussion.

The test session definition module 482 may interface with a user, such as a test engineer, via the user interface 464. The test session definition module 482, in conjunction with the user, may define a test session. Defining a test session may include defining a plurality of ports to be used to test the DUT and defining a role that each port unit will play during the test session. During a test session, a port may emulate a single device, such as a server, or a plurality of virtual devices connected to the DUT. For example, a single port may represent another network, such as a local area network linking a large number of client devices. In this case, the port may emulate the network and all of the client devices connected to the network. A single port may also emulate a switch or router that connects to a large number of other devices. In this case, the port may emulate the switch or router and all of the connected devices. Defining a plurality of ports may include defining a unique address, such as an IPv4 or IPv6 address, for each of virtual devices to be emulated by each port during the test session.

When a port is connected to a DUT, the port must announce its presence to the network and describe what device or devices may be accessed via the port. To this end, the port may exchange information with the DUT using one or more routing protocol, such as OPSF (open shortest path first protocol), EIGRP (enhanced interior gateway routing protocol), IS-IS (intermediate system to intermediate system protocol), RIP (routing information protocol, or BGP (border gateway protocol). An exchange of routing information may occur at initiation of a test session and periodically during the test session. Thus, defining a plurality of ports may also include selecting one or more routing protocols and structuring the information that the port will provide to the network using the selected routing protocol(s). This information may include, for example, a list or other description of the device addresses that can be accessed via the port.

Defining a test session may also include defining the traffic to be generated by the ports while testing the DUT. For example, when a DUT is a switch or router operating at layer 2 or layer 3 of the network structure, the test traffic may include a large plurality of IP packets apparently originating from a plurality of source devices emulated by ports external to the DUT and destined for a plurality of destination devices emulated by ports external to the DUT. Defining a test session may also include defining the traffic statistics to be collected by the ports during the test session. Traffic statistics may include temporal information such as the latency time required to transmit a packet via the DUT, and quantitative information such as the number of packets lost during transit through the DUT and/or the number of packets reordered during transit through the DUT. Defining a test session may also include defining packets to be captured by the ports.

Each port defined by the test session definition module may be distributed between a test head directly coupled to the DUT and the test application server. The test head configuration module 484 may develop test head configuration data 474 to configure each test module to play is respective part in the test session. The test head configuration data 474 may include data defining the traffic to be generated by a traffic generator within each test head. The test head configuration data 474 may include data defining test data to be acquired, packets to be captured, and/or test results to be reported by a traffic receiver within each test head. The test head configuration data 474 may be disseminated to the test heads via the test head interface 466. For example, some or all of the test head configuration data 474 may be transmitted in packets addressed to specific test heads. Some or all of the test head configuration data 474 may be broadcast to all of the test heads, with test head extracting the configuration data required for it to play its intended role in the test session.

Portions of the test heads may be implemented using field programmable gate arrays or other programmable devices. In this case, the test head configuration data 474 may also include programming data to be used to program one or more programmable devices within the test heads.

The test session may be initiated after the test head configuration data 474 has been disseminated to the test heads. During the test session, the port processor module 486 may emulate respective port processors associated with each of the plurality of test heads. Emulating the port processors may include processing stateful traffic received by and/or to be transmitted by the respective test head. To this end, the port processor module may maintain state tables 476 containing status information for each stateful connection between the test application server 460 and the DUT. The stateful traffic includes the exchange of routing information using routing protocols as defined by the test session definition module 482. The stateful traffic may include other network control traffic using protocols such as ICMP (internet control message protocol) and LDP (label distribution protocol). The stateful traffic processed by the port processor module 486 may also include some stateful test traffic such as TCP connections. However, since the bandwidth of the communications link from the test applications ever 460 to each test head may be substantially lower than the bandwidth of the connection between the test head and the DUT, stateful test traffic may be only a small fraction of the total traffic exchanged between the test head and the DUT.

During or after a test session, the test results module 488 may collect, analyze, and report test data from some or all of the test heads. For example, the test result module may receive a request for specific test data from a user via the user interface 464. In response, the test results module 488 may request test data from one or more test heads. The test results module 488 may then aggregate or summarize the test data and present the results to the user via the user interface 464. Test results 478 may also be stored for future analysis and/or transmitted to another location via the network interface.

The time distribution module 490 may supervise distributing time synchronization data to the test heads, for example using the Precision Time Protocol (PTP) or IEEE 1588-2008 protocol. In general, these protocols work by periodically exchanging a sequence of time-stamped packets between the test application server 460 and each test head to synchronize a local clock in the test head with the master clock 492. A first packet containing a transmit timestamp t1 may be transmitted from the test application server 460 to a test head, which attaches a receive timestamp t2 to the packet upon reception. The test head may then transmit a second packet containing a transmit timestamp t3 to the test application server 460, which attaches a receive timestamp t4 to the packet upon reception. Each test head interface 466 may include hardware to insert transmit timestamps and attach receive timestamps provided by the master clock 492 to PTP packets. At least one additional packet may be sent to report the value of t4 to the test head. The latency time from the server to the test head is t2-t1, and the latency time from the test head to the server is t4-t3. However, given the direct and symmetrical connection between the test head and the application server, the quantities t2-t1 and t4-t3 should be the same. Any difference between these quantities is due to an offset between the master clock 492 and the local clock within the test head. The test head may then use this information to calibrate its local clock. The time distribution module may cause PTP time synchronization sequences to be performed periodically with each test head.

The functions of the test application server 460 may be distributed between multiple server computers. For example, a first server computer may perform user interface, test session definition, and results reporting. A second server computer may perform the functions of test head configuration and time distribution, and one or more additional server computers may perform stateful packet processing.

Description of Processes

Figure 5:
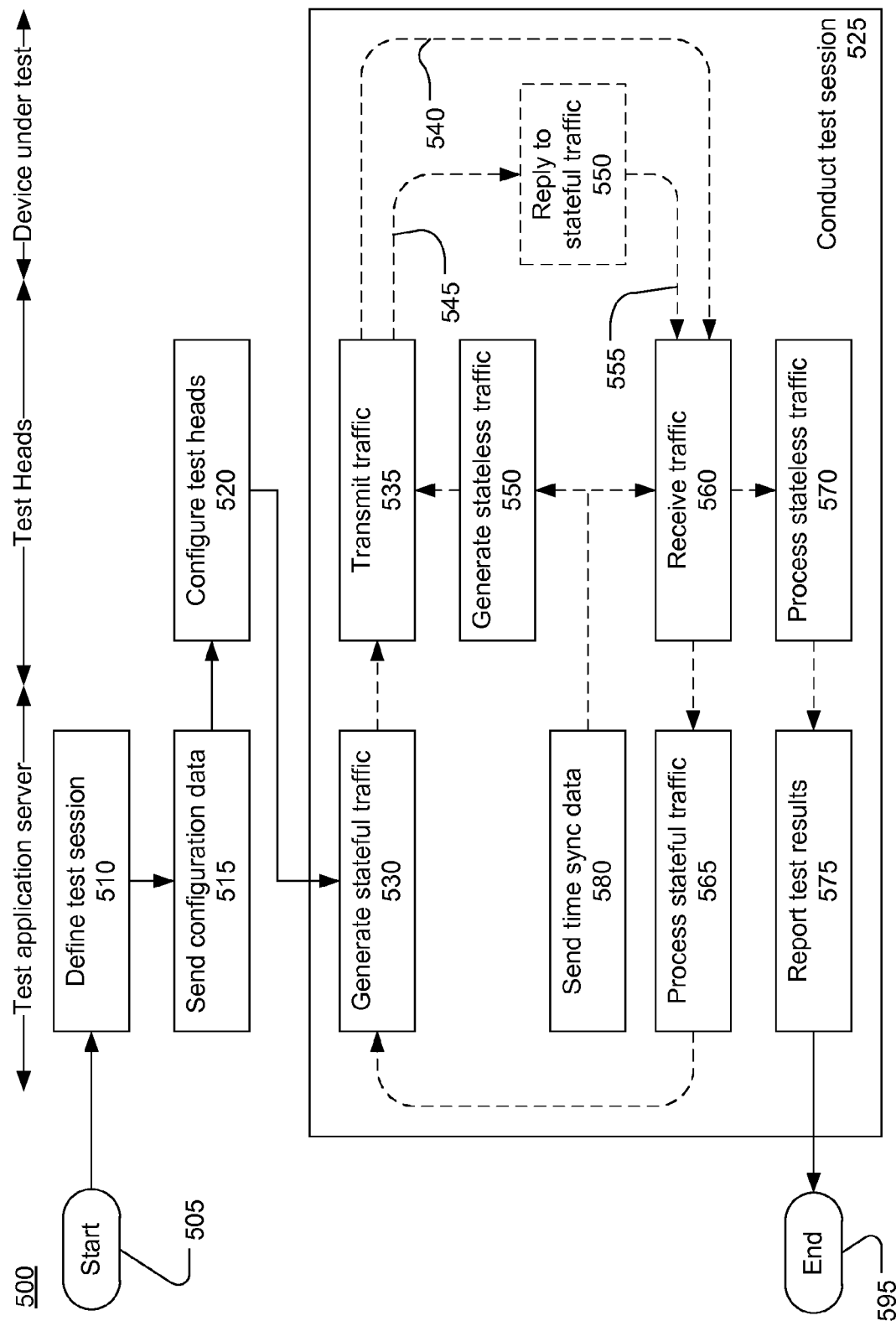
FIG. 5 is a flow chart of a process for testing a network.

Referring now to FIG. 5, a process 500 for testing a network device may start at 505 and end at 595. The process 500 may be performed by a computing device, such as the test application server 560, in conjunction with a plurality of test heads such as the test head 330. Although shown as a series of discrete actions for each of explanation, the process 500 is both highly parallel and cyclic. The process 500 generally consists of defining a test session at 510, configuring the test equipment at 515/520, and conducting the test session at 525. Conducting the test session at 525 may be performed for an extended time period, and the actions from 530 to 575 may be performed concurrently and may be repeated a large number of times during a test session. In FIG. 5, solid arrows indicate the flow of control and dashed arrows indicate the flow of information.

At 510, a test session may be defined. The test session may be defined, for example, by a test engineer in conjunction with a computing device such as the test application server 460. Defining a test session may include defining a plurality of ports to be used to test the DUT and defining a role that each port unit will play during the test session. Defining the plurality of ports may include defining a unique address, such as an IPv4 or IPv6 address, for each of virtual devices to be emulated by each port during the test session. Defining the plurality of ports may also include selecting one or more routing protocols and structuring the information that the port will provide to the network using the selected routing protocol(s). This information may include, for example, a list or other description of the device addresses that can be accessed via the port.

Defining a test session at 510 may also include defining the traffic to be generated by the ports while testing the DUT. For example, when a DUT is a switch or router operating at layer 2 or layer 3 of the network structure, the test traffic may include a large plurality of IP packets apparently originating from a plurality of source devices emulated by ports external to the DUT and destined for a plurality of destination devices emulated by ports external to the DUT. Defining a test session at 510 may also include defining the traffic statistics to be collected by the ports during the test session. Traffic statistics may include temporal information such as the latency time required to transmit a packet via the DUT, and quantitative information such as the number of packets lost during transit through the DUT and/or the number of packets reordered during transit through the DUT. Defining a test session may also include defining packets to be captured by the ports.

Once the test session has been defined, configuration data may be sent to a plurality of test heads at 515. The configuration data may include all data necessary for the test heads to collectively execute the test session defined at 510. For example, the configuration data may include data defining stateless traffic to be generated by a traffic generator within each test head and data defining test data to be acquired, packets to be captured, and/or test results to be reported by a traffic receiver within each test head. Some or all of the configuration data may be sent at 515 as packets addressed to specific test heads. Some or all of the configuration data may be broadcast to all of the test heads, with each test head extracting the configuration data required for it to play its intended role in the test session.

Portions of the test heads may be implemented using field programmable gate arrays or other programmable devices. In this case, the configuration data sent at 515 may also include programming data to be used to program one or more programmable devices within the test heads.

The configuration data sent at 515 may be used to configure the test heads at 520. Configuring the test heads may include storing configuration data in the appropriate registers or memory locations to cause the test head to perform as required to execute the test session defined at 510. When test heads include field programmable gate arrays or other programmable devices, configuring the test heads at 520 may also include programming the programmable devices.

After the test heads are configured at 520, the test session may be conducted at 525. Generally, the test session will be initiated by an exchange of stateful traffic with the DUT to allow the test application server and the test heads to announce their presence to the DUT and describe what device or devices may be accessed via each test head. To this end, the test application server may exchange stateful traffic with the DUT using one or more routing protocol, such as OPSF (open shortest path first protocol), EIGRP (enhanced interior gateway routing protocol), IS-IS (intermediate system to intermediate system protocol), RIP (routing information protocol, or BGP (border gateway protocol). An exchange of routing information may occur at initiation of a test session and periodically during the test session.

Outgoing stateful traffic, such packets containing routing information, may be generated in the test application server at 530. Each packet of outgoing stateful traffic may be transferred to a selected test head for transmission to the DUT at 535. The outgoing stateful traffic 545 may be received and processed by the DUT, which may generate response traffic at 550. Each packet of incoming stateful traffic 555 may be received by one of the test heads at 560 and may be transferred to the test application server for processing at 565. The results of processing stateful traffic may commonly require the generation of additional stateful traffic at 530.

Once routing information has been exchanged with the DUT, the test heads may generate stateless outgoing traffic at 550. For example, when a DUT is a switch or router operating at layer 2 or layer 3 of the network structure, the outgoing stateless traffic may include a large plurality of IP packets apparently originating from a plurality of source devices external to the DUT and destined for a plurality of destination devices that are also external to the DUT. The plurality of source devices and the plurality of destination devices are emulated by the test heads connected to the DUT. Stateless outgoing traffic generated may be interleaved with stateful outgoing traffic for transmission to the DUT at 535.

Stateless outgoing traffic 540 may be transmitted through the DUT will minimal modification. For example, the DUT may transmit stateless traffic without modification or may only change selected fields (e.g time-to-live, a header checksum, and/or a cyclic redundancy code) in some or all of the stateless traffic packets. In some circumstances, the DUT may add fields (e.g. MPLS labels, extension headers) to some or all of the stateless traffic packets. Stateless traffic 540 transmitted through the DUT may be received at 560 and processed at 570. Generally, but not necessarily, stateless traffic will be received by a different test head from the test head the initially transmitted the stateless traffic. Processing the stateless traffic at 570 may include collecting traffic statistics at each test head. Each test head may collect a predetermined set of traffic statistics, or may collect only selected traffic statistics as defined in the configuration data sent at 515. Traffic statistics may include temporal information such as the latency time required to transmit a packet via the DUT, and quantitative information such as the number of packets lost during transit through the DUT and/or the number of packets reordered during transit through the DUT. Processing the stateless traffic at 570 may also include capturing selected packets as defined in the configuration data sent at 515.

During and at the conclusion of a test session, test results may be reported at 575. Reporting test results may include displaying test results to a user, printing test results, storing test results for future use, transmitting test results to another device via a network and/or other methods of documenting the test results. For example, during a test session, test results may be reported in response to a request from a user received by the application server. The application server may then request traffic statistics necessary to respond to the request from one or more test head. The application server may aggregate or otherwise process test statistics received from the test heads and report the results. This action may take place in real-time with test statistics updating on the test application server while the test session is in progress.

At the conclusion of a test session, the application server may retrieve all traffic statistics from all of the test heads and store or otherwise report the raw traffic statistics and/or aggregated/processed traffic statistics. After all traffic statistics have been retrieved and reported, the process 500 may end at 595

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A system for testing a device under test, comprising:
    two or more test heads configured to mate directly with respective connectors on the device under test, each test head including
        a traffic generator including a stateless packet builder to generate stateless traffic for transmission to the device under test, and
        a traffic receiver including a stateless packet analyzer to accumulate traffic statistics on stateless traffic received from the device under test; and
    a server coupled to the two or more test heads via respective communications links, the server configured to
        generate stateful traffic for transmission to the device under test by the two or more test heads, and
        process stateful traffic received from the device under test by the two or more test heads.

2. The system for testing a device under test of claim 1, wherein each test head further comprises:
    a system interface to transmit data to and receive data from the server over the respective communications link.

3. The system for testing a device under test of claim 2, wherein each traffic receiver further comprises:
    a stateful traffic filter to direct stateful traffic received from the device under test to the system interface for transmission to the server.

4. The system for testing a device under test of claim 2, wherein each traffic generator further comprises:
    an interleaver to generate test traffic for transmission to the device under test by combining stateful traffic received from the server via the system interface and stateless traffic generated by the stateless packet builder.

5. The system for testing a device under test of claim 2, wherein
    each test head further comprises a clock, and
    each system interface is configured to receive time synchronization data to synchronize the clock to a remote master clock.

6. The system for testing a device under test of claim 1, wherein
    at least one test head is configured to receive electrical power from the device under test.

7. The system for testing a device under test of claim 1, wherein
    at least one test head is configured to receive electrical power from the server.

8. A test head for testing a device under test, comprising:
    a connector configured to mate directly with a mating connector on the device under test;
    a system interface to transmit data to and receive data from a server over a communications link;
    a traffic generator to generate outgoing test traffic for transmission to the device under test via the connector, comprising:
        a stateless packet builder to generate stateless traffic, and
        an interleaver to combine stateful traffic received from the server via the system interface and stateless traffic generated by the stateless packet builder to provide the outgoing test traffic; and
    a traffic receiver to receive incoming test traffic from the device under test via the connector, comprising:
        a stateless packet analyzer to accumulate traffic statistics on stateless traffic received from the device under test, and
        a stateful traffic filter to direct stateful traffic received from the device under test to the system interface for transmission to the server.

9. The test head of claim 8, further comprising:
    a clock, wherein
    the system interface is configured to receive time synchronization data to synchronize the clock to a remote master clock.

10. The test head of claim 8, wherein
    the test head is configured to receive electrical power from the device under test.

11. The test head of claim 8, wherein
    the test head is configured to receive electrical power from the server.

12. A method for testing a device under test, comprising:
    mating two or more test heads directly with respective connectors on the device under test;
    each test head generating and transmitting stateless traffic to the device under test;
    each test head accumulating traffic statistics on stateless traffic received from the device under test;
    a server coupled to the two or more test heads via respective communications links generating stateful traffic for transmission to the device under test by the two or more test heads; and
    the server processing stateful traffic received from the device under test by the two or more test heads.

13. The method for testing a device under test of claim 12, further comprising:
    a system interface within each test head transmitting data to and receiving data from the server over the respective communications link.

14. The method for testing a device under test of claim 13, further comprising:
    filtering traffic received from the device under test to direct stateful received traffic to the system interface for transmission to the server.

15. The method for testing a device under test of claim 13, further comprising:
    interleaving stateful traffic received from the server via the system interface and stateless traffic generated within the test head to generate test traffic for transmission to the device under test.

16. The method for testing a device under test of claim 13, further comprising:
   the server transmitting time synchronization data to each test head via the respective system interface; and
   each test head using the time synchronization data to synchronize a local clock to a remote master clock.

17. The method for testing a device under test of claim 12, further comprising:
   at least one test head receiving electrical power from the device under test.

18. The method for testing a device under test of claim 12, further comprising:
   at least one test head receiving electrical power from the server.

* * * * *